May 30, 1939.  J. F. EVERSOLE  2,160,064
MANUFACTURE OF FORMIC ACID
Filed June 17, 1936
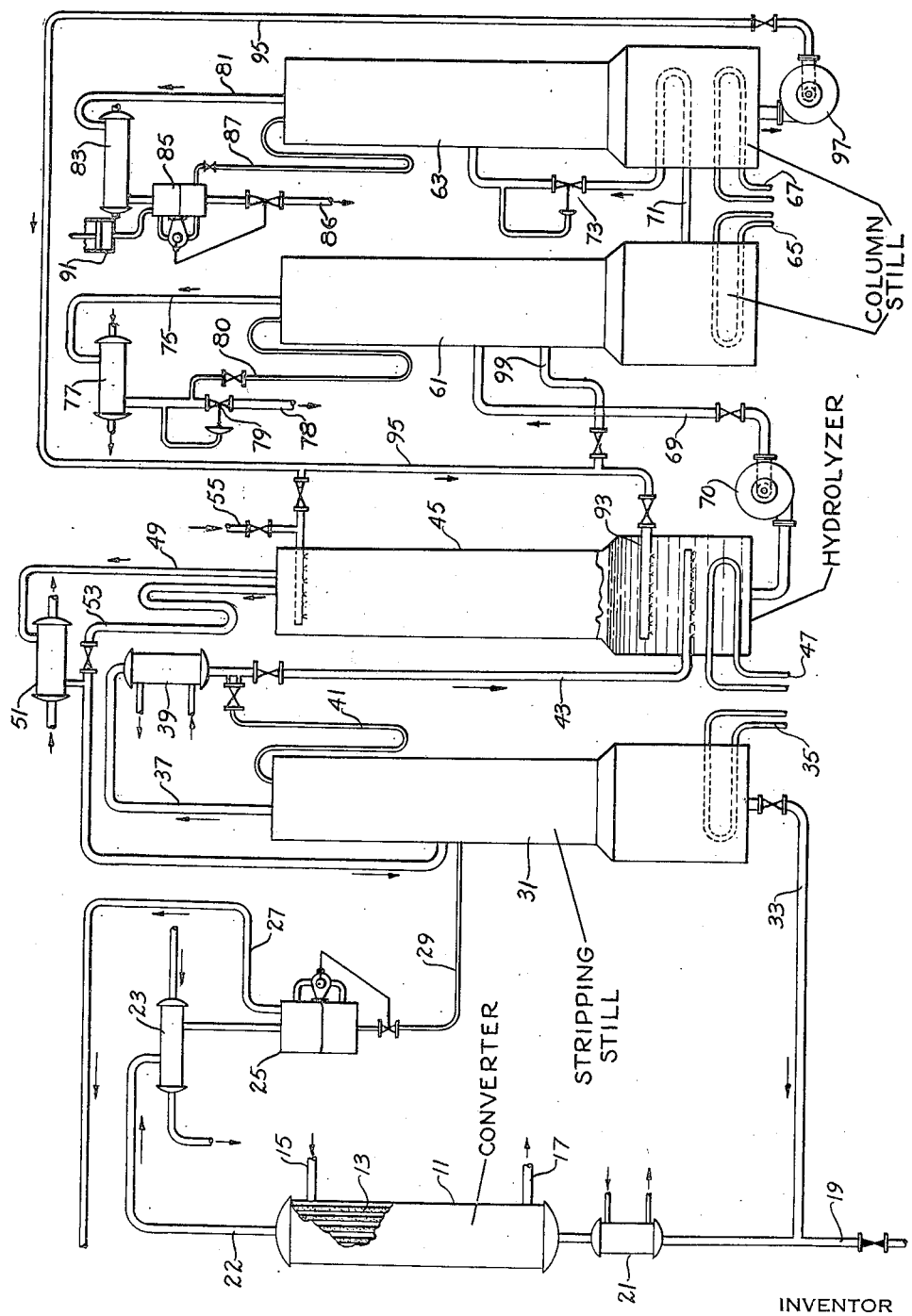
INVENTOR
JAMES F. EVERSOLE.
BY
ATTORNEY Patented May 30, 1939

2,160,064

UNITED STATES PATENT OFFICE 2,160,064

MANUFACTURE OF FORMIC ACID

James F. Eversole, Charleston, W. Va., assignor to Carbide and Carbon Chemicals Corporation, a corporation of New York Application June 17, 1936, Serial No. 85,664

16 Claims. (Cl. 260—542)

This invention relates to the manufacture of formic acid; and more especially it concerns a process and apparatus for the production from methanol of concentrated or substantially pure formic acid, preferably continuously or semi-continuously. The invention provides for the concentration in novel manner of the dilute aqueous solution of formic acid produced in a prior step of the process.

Broadly stated, the process comprises dehydrogenating methanol in the vapor phase at temperatures between 150° and 400° C., preferably at around atmospheric pressure, in the presence of a dehydrogenation catalyst of reduced copper oxide which may contain a small amount of a reaction promoter such as chromium oxide or reduced nickel oxide. The dehydrogenation yields methyl formate and hydrogen almost exclusively, in admixture with unreacted methanol and carbon monoxide, and some traces of formaldehyde.

The condensable components of the reaction mixture are condensed, and the non-condensable gases are removed from the system. They may be conducted to a suitable converter for use in methanol synthesis.

The condensate contains methyl formate and unreacted methanol. The former is distilled from the mixture, preferably at atmospheric pressure, and the residual methanol is returned to the dehydrogenation unit. The methyl formate passes continuously into the kettle of a column still maintained under atmospheric pressure, and into contact with a boiling aqueous solution of formic acid, which may contain a small amount of catalytic proportion of a hydrolysis catalyst, such as sulfuric acid or other mineral acid, or a water-soluble inorganic base. A 0.2% to 0.4% aqueous solution of sulfuric acid is very active as a hydrolyzing medium. The methyl formate partially hydrolyzes to yield methanol and dilute formic acid. Since the hydrolysis is incomplete in a single pass, there is present in the reaction zone methyl formate, methanol, formic acid and water, and a trace of the sulfuric acid or other catalyst promoting the hydrolysis. When methyl formate is introduced into the boiling solution containing around 0.2% of sulfuric acid in the kettle of a column still, a part of the formate hydrolyzes, while the remainder, together with methanol formed by the hydrolysis of the formate, escapes rapidly up the column. If the column is "wet", and particularly if it contains a trace of catalyst, further hydrolysis occurs there. However, a substantial portion of unreacted vaporized methyl formate passes from the column to a condenser in admixture with the methanol vapors formed by the hydrolysis of the formate. Any formic acid produced in the column is readily washed back into the kettle by the reflux stream.

The reaction consumes water from the hydrolyzing medium, and the concentration of formic acid in the kettle increases. This concentration may continue to a point short of the composition of the constant boiling mixture of formic acid and water at atmospheric pressure. Although the constant boiling mixture of formic acid and water at atmospheric pressure contains 77.5% by weight of formic acid, it is preferable, for economical operation, to keep the concentration of formic acid below this point, since the rate of hydrolysis decreases as the formic acid concentration in the hydrolyzing medium increases. In practice, concentrations of from 15% to 60% of formic acid may be secured. Water may be added to the kettle continuously or intermittently to control the formic acid concentration. By utilizing in the hydrolysis a packed or bubble-cap type column, the concentration of formic acid in the kettle may be continued to a point at or very near which the 77.5% constant boiling mixture is produced. The dilute formic acid solution distilling from the kettle, with fractionation in the column and with added water to replace that consumed, then becomes the hydrolyzing medium in the column.

Preferably the reaction mixture is withdrawn from the hydrolyzing zone at such rate as to maintain a formic acid concentration of around 15% to 30% in the kettle liquor. Some of the catalyst is withdrawn with the dilute acid liquor; but it subsequently is returned in concentrated form from the acid concentration step hereinafter described.

The removal of methyl formate and methanol from the hydrolysis zone is rapid and complete at the boiling temperature of the formic acid solution. The vapors leaving the hydrolyzing vessel are condensed; and the condensate then preferably flows to a still, such as the column still receiving the condensed reaction products from the dehydrogenation step, wherein the methanol is separated from the methyl formate. The former is conducted to the dehydrogenation zone; and the latter is conducted to the hydrolysis zone.

For the purpose of concentrating the dilute solution of formic acid, it is continuously or intermittently withdrawn from the hydrolyzing zone and is subjected to a plurality of distillations under successively lower pressures. Formic acid and water have been found to form maximum boiling azeotropic mixtures, the compositions of which vary rapidly with changes in pressure. Consequently it has been found possible to set wide limits for the aqueous formic acid azeotropic compositions being distilled in the respective distillation stages, thereby facilitating the use of imfractionation without necessitating the use of impractically high pressures. In practice the theoretical azeotropic compositions corresponding to the pressures under which the respective distillations are conducted are not necessarily reached in the distillation but only approached.

In the concentration, the dilute formic acid solution from the hydrolysis first is distilled under a pressure at which an azeotropic mixture is formed that is higher in formic acid content than the said dilute solution from the hydrolysis. Water is removed overhead, and the resultant liquid azeotropic mixture which is relatively rich in formic acid then is distilled under a lower pressure than that used in the first distillation, whereby concentrated formic acid is distilled overhead and a second azeotropic liquid mixture is formed which is lower in formic acid content than is the azeotropic liquid mixture produced in the first-named distillation. At least the major portion of this second azeotropic mixture is returned to the first-named distillation zone, together with an additional quantity of dilute formic acid solution from the hydrolysis. The balance of the azeotropic mixture may be conducted to the kettle of the hydrolyzer and serves to introduce thereto additional hydrolyzing medium and catalyst.

In the accompanying drawing which illustrates somewhat diagrammatically apparatus adapted for the practice of the process, numeral 11 designates a dehydrogenation converter having therein a plurality of catalyst tubes 13; and an inlet 15 and an outlet 17 for a heating fluid such as a hydrocarbon oil. A valve-controlled methanol inlet line 19 leads to a preheater and vaporizer 21, the outlet from which is connected with the converter 11. The preheater has the usual inlet and outlet for a heating fluid such as high pressure steam.

The outlet 22 from the converter leads to a water-cooled condenser 23, the outlet from which is connected with a constant-level liquid-gas separator 25 of well-known construction having an upper gas outlet 27, and a liquid outlet 29 connected with the midportion of a column stripping still 31. The kettle of the latter is connected with the inlet of the converter 11 by a valve-controlled conduit 33 and line 19. The kettle contains a closed heating coil 35.

The upper portion of the still 31 has a vapor outlet line 37 having therein a water-cooled condenser 39. A reflux line 41 leads from the condenser 39 to the still 31. A line 43 connects the condenser with a distributing header in the lower portion of a hydrolyzer and column still 45 having a kettle provided with a closed heating coil 47. A vapor outlet line 49, having therein a water-cooled condenser 51, connects the upper portion of the hydrolyzer 45 with the midportion of the column of still 31. A valve-controlled reflux line 53 connects the outlet from the condenser 51 with the hydrolyzer, and with the still 31. A valve-controlled conduit 55 conducts water to the hydrolyzer as required.

For concentrating the dilute formic acid solution produced in the hydrolyzer, there are provided the column stills 61 and 63, having therein the respective closed heating coils 65 and 67. The midportion of the column of still 61 is connected with the kettle of hydrolyzer 45 by valve-controlled conduit 69 having therein a pump 70 adapted to force liquid from the hydrolyzer to the still 61. A liquid conduit 71, having therein a pressure-reducing valve 73, connects the kettle of still 61 with the midportion of the column of still 63. A portion of the conduit 71 extends within the kettle of the last-named still for heat exchange purposes.

A vapor outlet line 75 connects the still 61 with a water-cooled condenser 77, the outlet from which is connected with a point of water discharge by means of a conduit 78 having therein a pressure-reducing valve 79. A reflux line 80 establishes communication between condenser 77 and still 61.

A vapor outlet line 81 connects the still 63 with a condenser 83, the outlet of which leads to an automatic constant-level liquid-gas separator 85. The outlet from the latter is connected by line 86 with a point of storage for concentrated or pure formic acid. A reflux line 87 connects the liquid outlet of the separator 85 with the still 63. A vacuum pump 91 has its inlet connected with the upper part of the separator 85 and is adapted to create and maintain a vacuum in the still 63.

The kettle of still 63 is connected with a distributing pipe 93 in the kettle of the hydrolyzer 45 by means of a valve-controlled conduit 95 having therein a pump 97. The said conduit also is connected with the midportion of the column of still 61 by a valve-controlled line 99. Preferably the hydrolyzer 45, stills 61 and 63, and associated parts are made of a corrosion-resistant metal or alloy, or are lined or surfaced therewith.

The following will illustrate the process features of the invention:

Methanol is vaporized and is passed at atmospheric pressure over a dehydrogenation catalyst deposited on an inert carrier, in the catalyst zone of converter 11, maintained at about 195° C.

The catalyst for the dehydrogenation may be finely-divided reduced copper, preferably distributed through a granular porous support such as pumice stone, unglazed porcelain, charcoal, or silica gel. A preferred catalyst consists of reduced copper together with from about 1% to 5% of chromium in the form of oxide supported on an inert carrier. It may be made by drying chips of a porous artificial filter stone such as "Filtros" which have been immersed in an aqueous solution of copper nitrate and chromium nitrate, followed by a roasting of the dried chips in a blast of air heated to about 600° C. until evolution of nitrogen oxide fumes ceases, after which the chips are reduced in a stream of hydrogen at about 250° C. The preparation of this catalyst is more fully described in U. S. Patent 1,977,750 of M. K. Young. The reduced copper catalyst may be made in similar manner, excepting that no chromium nitrate is used.

In the converter 11, around 15% to 30% of the methanol is converted to methyl formate; and the effluent contains, in addition thereto, hydrogen, some carbon monoxide, unreacted methanol, and in some instances small amounts of formaldehyde. Overall yields of 20% to 30% of methyl formate thus have been obtained, with efficiencies above 90%.

Thus, upon passing methanol vapors at atmospheric pressure and at a space velocity of 43 liters of the vapors per liter of catalyst per hour, over a finely-divided reduced copper catalyst deposited upon porous artificial filter stone in a converter maintained at a temperature of 190° C., an overall yield of methyl formate of 22.6% was obtained, with a production ratio of 13 grams of the formate per liter of catalyst per hour.

The reaction mixture leaving the converter 11 has its condensable components condensed in the condenser 25. The gaseous components,—hydrogen, carbon monoxide, and formaldehyde, if present,—are withdrawn continuously through conduit 27 to a source of reuse, such as a synthetic methanol plant.

The condensed liquid flows to the stripping still 31 wherein a kettle temperature of around 64° C. is maintained, and the methyl formate is distilled from the methanol. The latter is withdrawn either continuously or intermittently and is fed to the dehydrogenation converter. The methyl formate is condensed in condenser 39 and is introduced into the boiling hydrolyzing liquid in the kettle of the hydrolyzing still 45, the latter being operated at atmospheric pressure under conditions such that the liquid as withdrawn for concentration is an approximately 30% aqueous solution of formic acid containing around 0.2% of sulfuric acid. The withdrawn liquid is replaced by water. If desired, portions of the liquid mixture from the still 63 also may be introduced through line 95 for the purpose of returning the catalyst to the hydrolyzer.

The unhydrolyzed methyl formate and the methanol formed by the hydrolysis are volatile at the temperature of the boiling liquid in the hydrolyzer and are rapidly and completely withdrawn, condensed, and conducted to the stripping still 31.

The approximately 30% aqueous solution containing the catalyst is pumped from the hydrolyzer either continuously or intermittently into the midportion of the column of still 61. The major portion of the liquid azeotrope from still 63 also is pumped into the still 61 at a lower point in the column. The still 61 may be operated with a pressure of 40 pounds per square inch absolute and a temperature around 130° C. existing in the upper end of the column, with the liquid contents of the kettle under a pressure of 45 pounds per square inch absolute, and at a temperature of around 139° C.

The water vapor leaving the still 61 is condensed, and water is removed through the condenser outlet line past the valve 79.

The concentrated liquid in the kettle of still 61 at least closely approaches an azeotropic mixture of formic acid and water under the pressure existing in the still; and contains about 84% of formic acid. It is conducted through line 71 to the still 63, the latter of which is maintained under suitable vacuum by means of the pump 91. In the present instance, the upper part of the column of that still is maintained under a pressure of around 125 mm. of mercury absolute, and at a temperature of about 50° C.; and the liquid in the kettle is under a pressure of around 175 mm. of mercury absolute, and at a temperature of about 63° C. This liquid closely approaches the composition of an azeotropic mixture of formic acid and water under the pressure conditions used, and contains arount 63% of formic acid. When an inorganic hydrolysis catalyst is used, this last-named liquid is richer in the catalyst than is the formic acid solution formed in the hydrolyzer 45; and portions of the said liquid are returned to the hydrolyzer and assist in maintaining in the latter a suitable concentration of the catalyst.

The presence of the catalyst, as sulfuric acid, in the liquid being concentrated slightly alters the azeotropic composition at the various pressures. Thus, if a 30% aqueous solution of formic acid containing 0.2% sulfuric acid is fed to the still 61 operating at 40 pounds per square inch absolute pressure, the azeotropic liquid flowing to the vacuum still 63 will contain about 84% of formic acid instead of the 85% which it otherwise would contain in the absence of the sulfuric acid. Similarly, 63% formic acid may be produced in the vacuum still instead of the 65% acid ordinarily produced in the absence of sulfuric acid. The presence of the acid or other water-soluble catalyst for the hydrolysis does not prevent the practical operation of the system.

The concentration of sulfuric acid in the formic acid solution should not be permitted to become sufficiently great to decompose the formic acid to carbon monoxide and water. This sulfuric acid concentration is kept at a harmlessly low value of between 1% and 10% by returning continuously to the hydrolyzer from the vacuum still 63 a quantity of the kettle liquor which contains the catalyst in concentrated form. Thus the catalyst may be used repeatedly in the process.

Obviously, for concentration purposes it is not necessary to operate the stills 61, 63 under the conditions named. Thus if an aqueous solution of formic acid containing less than 84.5% of the acid is distilled under 1800 mm. of mercury absolute pressure, at a temperature around 130° to 133° C., water may be removed overhead, and an azeotrope containing around 84.5% formic acid will be delivered to the kettle. When this azeotropic composition is distilled under 15 mm. of mercury absolute pressure, pure formic acid is vaporized and removed at a temperature around 17° C., and an azeotropic liquid containing about 60% of formic acid is delivered from the kettle to the column of the still operating at the higher pressure.

Formic acid of even 100% strength readily may be produced from methanol by the present process. In order to secure formic acid of high purity, the liquid mixture introduced to the still operating at the lower pressure preferably should have a formic acid concentration substantially above that of the azeotropic composition produced in the kettle of that still.

I claim:

1. The cyclic process which comprises hydrolyzing methyl formate in a hydrolyzing zone in the presence of an inorganic hydrolysis catalyst, thereby producing formic acid and methanol, continuously distilling unreacted methyl formate and methanol from the hydrolyzing zone, conducting the dilute formic acid solution containing the catalyst to a first distillation zone, distilling the said solution therein under a pressure sufficiently high to vaporize water and to form a catalyst-containing liquid mixture enriched in formic acid, removing the vaporized water, conducting the said enriched liquid mixture to a second distillation zone maintained at a pressure and temperature substantially below those existing in the first distillation zone, thereby vaporizing substantially pure formic acid and producing an approximately azeotropic liquid mixture containing more of said catalyst and less formic acid than is present in the liquid mixture produced in the first distillation zone, separately recovering the formic acid thus vaporized, and conducting the liquid mixtures formed in each of the respective distillation zones to the other of the said zones and distilling the same therein.

2. The process as defined in claim 1, wherein at least a portion of the liquid mixture withdrawn from said second distillation zone is fed to said hydrolyzing zone.

3. The process as defined in claim 1, wherein the dilute solution of formic acid in the hydrolyzing zone contains a small amount of a mineral acid, and wherein at least a portion of the liquid mixture withdrawn from said second distillation zone is fed to said hydrolyzing zone.

4. The process as defined in claim 1, wherein the dilute solution of formic acid in the hydrolyzing zone contains a small amount of sulfuric acid.

5. The cyclic process which comprises hydrolyzing methyl formate in a hydrolyzing zone in the presence of a boiling dilute solution of formic acid containing an inorganic hydrolysis catalyst, removing from the hydrolyzing zone unreacted methyl formate, methanol and an aqueous solution of formic acid containing said catalyst, conducting said formic acid solution to a first distillation zone, distilling said solution therein under a pressure sufficiently high to vaporize water and to form a liquid mixture enriched in formic acid containing said catalyst, removing the vaporized water, conducting said enriched liquid mixture to a second distillation zone maintained at a pressure essentially below that existing in the first distillation zone, thereby vaporizing substantially pure formic acid and producing an approximately azeotropic liquid mixture containing less formic acid and more of said catalyst than the first-named liquid mixture, separately recovering the formic acid thus vaporized, conducting the liquid mixtures formed in each of the respective distillation zones to the other of said zones and distilling the same therein, and returning a portion of the liquid mixture containing the catalyst from said second distillation zone to the hydrolyzing zone.

6. The cyclic process which comprises hydrolyzing methyl formate in a hydrolyzing zone in the presence of a water-soluble hydrolysis catalyst, thereby producing methanol and an aqueous solution of formic acid, continuously distilling unreacted methyl formate and methanol from the hydrolyzing zone, conducting the residual formic acid solution containing said catalyst and between 15% and 60% of formic acid to a first distillation zone, distilling the said solution therein under a pressure sufficiently high to vaporize water and to form a catalyst-containing liquid mixture enriched in formic acid, removing the vaporized water, conducting the said enriched liquid mixture to a second distillation zone maintained under subatmospheric pressure, thereby vaporizing substantially pure formic acid and producing an approximately azeotropic liquid mixture containing less formic acid and more of said catalyst than the first-named liquid mixture, separately recovering the formic acid thus vaporized, and conducting the liquid mixtures formed in each of the respective distillation zones to the other of the said zones and distilling the same therein.

7. Process of converting methanol into concentrated formic acid, which comprises dehydrogenating methanol in the vapor phase at around atmospheric pressure and at a temperature within the range of from around 150° to 400° C., in the presence of a dehydrogenation catalyst, thereby producing methyl formate, hydrolyzing the methyl formate to formic acid and methanol while concurrently separating methanol and unhydrolyzed methyl formate from the said acid, distilling the aqueous solution of formic acid in a first distillation zone maintained under a pressure at least as great as atmospheric pressure, thereby separating water in the vapor phase and producing an at least approximately azeotropic liquid mixture enriched in formic acid, distilling the last-named liquid mixture in a second distillation zone under a pressure substantially below that maintained in the first distillation zone, thereby vaporizing substantially pure formic acid in vapor form and producing a second at least approximately azeotropic liquid mixture, separating and condensing the formic acid vapors, and returning the last-named liquid mixture to the said first distillation zone.

8. A process as defined in claim 7, wherein the hydrolysis of the methyl formate is effected in the presence of a water-soluble catalyst for the hydrolysis.

9. Process of converting methanol into concentrated formic acid, which comprises dehydrogenating methanol in the vapor phase at around atmospheric pressure and at a temperature within the range of from about 150° to 400° C., in the presence of a dehydrogenation catalyst, separately recovering from the reaction mixture methanol and methyl formate, returning the former to the dehydrogenation zone, hydrolyzing the methyl formate in the presence of a small amount of sulfuric acid while concurrently recovering methanol and unhydrolyzed methyl formate from the said solution, returning the methanol to the dehydrogenation zone, returning the methyl formate to the hydrolyzing zone, continuously conducting the said aqueous solution of formic acid and sulphuric acid to a first distillation zone maintained under a pressure at least as great as atmospheric and distilling the solution therein, thereby separating water in the vapor phase and producing an at least approximately azeotropic liquid mixture containing said sulphuric acid and enriched in formic acid, distilling the last-named liquid mixture in a second distillation zone under a pressure substantially below that maintained in the first distillation zone, thereby vaporizing substantially pure formic acid and producing a second azeotropic liquid mixture containing formic acid and said sulphuric acid, separating and condensing the formic acid vapors, returning at least the major portion of the last-named liquid mixture to the said first distillation zone, and at least intermittently conducting a portion of the last-named liquid mixture containing sulphuric acid to the hydrolyzing zone.

10. The process of concentrating an aqueous solution of formic acid, containing an inorganic hydrolysis catalyst which comprises fractionally distilling the said solution under conditions of pressure effecting removal of water in the vapor phase and forming an enriched aqueous formic acid solution which at least approaches an azeotropic composition at the said pressure and contains said catalyst, fractionally distilling the last-named solution under a lower pressure than that maintained during the first-named distillation, thereby separating substantially pure formic acid in vapor form, and forming a second formic acid solution at least approximating the azeotropic composition at the said lower pressure and which is lower in formic acid content than the first-named solution and contains said catalyst, condensing and recovering the pure formic acid, and returning the said second formic acid solution to the zone of the first-named distillation.

11. Process as defined in claim 10, wherein the aqueous solution of formic acid being concentrated contains a water-soluble inorganic hydrolysis catalyst.

12. Process as defined in claim 10, wherein the aqueous solution of formic acid being concentrated contains a mineral acid.

13. The continuous process for concentrating a dilute aqueous solution of formic acid, which comprises distilling in a first distillation zone an aqueous solution of formic acid which contains a water-soluble hydrolysis catalyst together with water in amount greater than that existing in the at least approximately azeotropic liquid mixture of formic acid and water produced in the said distillation zone, removing water in the vapor phase, concurrently distilling in a second distillation zone an aqueous solution containing said catalyst together with formic acid in amount greater than that existing in the at least approximately azeotropic liquid mixture produced under the pressure maintained in the said second distillation zone, removing substantially pure formic acid in vapor phase from the last-named zone, condensing and recovering the said pure formic acid, continuously conducting the said catalyst-containing liquid mixtures produced in each of the respective distillation zones to the other distillation zone, feeding additional dilute formic acid solution to one of the said distillation zones for concentration, and preventing formation in the respective liquid mixtures of concentrations of said catalyst sufficient to catalyze the decomposition of formic acid.

14. A cyclic process for concentrating an aqueous solution of formic acid containing a water-soluble hydrolysis catalyst, which comprises fractionally distilling the said solution under superatmospheric pressure in a first distillation zone, thereby separating water in vapor phase and forming an azeotropic liquid mixture enriched in formic acid and in said catalyst, fractionally distilling the last-named liquid mixture in a second distillation zone maintained under subatmospheric pressure, thereby separating substantially pure formic acid in vapor phase while concurrently forming a second azeotropic liquid mixture lower in formic acid content than the first-named azeotropic mixture, condensing and recovering the said formic acid, returning the said second azeotropic mixture to the first distillation zone, and diluting at least one of the said azeotropic mixtures with an aqueous solution of formic acid lower in catalyst content than said azeotropic mixture.

15. Process as defined in claim 14, wherein the respective distillations are conducted in the presence of a mineral acid, the concentration of which does not exceed around 10% of said liquid mixtures.

16. Process of making formic acid, comprising dehydrogenating methanol in the vapor phase at around atmospheric pressure to form methyl formate, hydrolyzing the latter thereby forming formic acid and methanol, separating the methanol from the formic acid, dehydrogenating the former, and utilizing in the process the methyl formate thus produced.

JAMES F. EVERSOLE.